United States Patent
Klatt et al.

(10) Patent No.: US 6,538,054 B1
(45) Date of Patent: Mar. 25, 2003

(54) FLAME-PROOF MOULDING COMPOUNDS

(75) Inventors: Martin Klatt, Mannheim (DE);
Brigitte Gareiss, Obersülzen (DE);
Motonori Yamamoto, Mannheim (DE);
Herbert Fisch, Wachenheim (DE);
Michael Nam, Ludwigshafen (DE);
Thomas Heitz,
Dannstadt-Schauernheim (DE); Bernd Leutner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/284,414

(22) PCT Filed: Oct. 16, 1997

(86) PCT No.: PCT/EP97/05705

§ 371 (c)(1),
(2), (4) Date: Apr. 14, 1999

(87) PCT Pub. No.: WO98/17720

PCT Pub. Date: Apr. 30, 1998

(30) Foreign Application Priority Data

Oct. 21, 1996 (DE) .......................... 196 43 280

(51) Int. Cl.[7] ...................... C08K 5/3492; C08K 5/103; C08K 5/20; C08K 5/523

(52) U.S. Cl. ...................... 524/101; 524/148; 524/151; 524/230; 524/311

(58) Field of Search ................ 524/101, 318, 524/230, 306, 313, 414, 417, 151, 148; 521/147, 146, 148

(56) References Cited

U.S. PATENT DOCUMENTS

| 3,533,994 A | * | 10/1970 | Stewart et al. | 524/318 |
|---|---|---|---|---|
| 4,176,101 A | * | 11/1979 | Leslie et al. | 524/230 |
| 4,180,496 A | * | 12/1979 | Yanagimoto et al. | 524/101 |
| 4,246,378 A | * | 1/1981 | Kometani et al. | 524/111 |
| 4,438,233 A | * | 3/1984 | Lee | 524/318 |
| 4,461,871 A | * | 7/1984 | Kometani et al. | 525/166 |
| 4,530,953 A | * | 7/1985 | Yoshida | 524/318 |
| 5,262,459 A | * | 11/1993 | Kotani et al. | 524/414 |
| 5,278,212 A | * | 1/1994 | Nishihara et al. | 524/141 |
| 5,399,429 A | * | 3/1995 | Asrar | 528/302 |
| 5,602,208 A | * | 2/1997 | Klamann et al. | 524/219 |
| 5,637,632 A | * | 6/1997 | Nozaki | 524/101 |
| 5,684,071 A | * | 11/1997 | Mogami et al. | 524/101 |
| 5,770,644 A | * | 6/1998 | Yamamoto et al. | 524/120 |
| 5,965,639 A | * | 10/1999 | Yamauchi et al. | 524/414 |

FOREIGN PATENT DOCUMENTS

| EP | 661 342 | 7/1995 |
|---|---|---|
| GB | 2 250 291 | 6/1992 |

OTHER PUBLICATIONS

L. Mascia: The Role of Additives in Plastics—pp. 1–3, 32–43, 106 (1974) Edward Arnold Pub. Ltd. London, Great Britain.*
JP Abst. 3281 652.
JP Abst. 05070671.

* cited by examiner

Primary Examiner—Peter Szekely
(74) Attorney, Agent, or Firm—Keil & Weinkauf

(57) ABSTRACT

Thermoplastic molding compositions comprise
A) from 30 to 96% by weight of a polyester
B) from 1 to 30% by weight of melamine cyanurate
C) from 1 to 30% by weight of at least one phosphorus-containing flame retardant
D) from 0.01 to 5% by weight of at least one ester or amide derived from a saturated or unsaturated aliphatic carboxylic acid having from 10 to 40 carbon atoms and a saturated aliphatic alcohol or &mine having from 2 to 40 carbon atoms
E) from 0 to 60% by weight of other additives and processing aids
where the total of the percentages by weight of components A) to E) is 100%.

15 Claims, No Drawings

FLAME-PROOF MOULDING COMPOUNDS

The invention relates to thermoplastic molding compositions comprising

A) from 30 to 96% by weight of a polyester
B) from 1 to 30% by weight of melamine cyanurate
C) from 1 to 30% by weight of at least one phosphorus-containing flame retardant
D) from 0.01 to 5% by weight of at least one ester or amide derived from a saturated or unsaturated aliphatic carboxylic acid having from 10 to 40 carbon atoms and a saturated aliphatic alcohol or amine having from 2 to 40 carbon atoms
E) from 0 to 60% by weight of other additives and processing aids where the total of the percentages by weight of components A) to E) is 100%.

The invention also relates to the use of the novel molding compositions to produce fibers, films or shaped articles, and to the shaped articles of any type thus obtained.

The market shows increasing interest in halogen-free flame-retardant polyesters. Important requirements of the flame retardant are: pale intrinsic color, sufficient thermal stability for incorporation in thermoplastics, and its efficacy in reinforced and non-reinforced polymers (wicking effect of glass fibers).

In addition, the UL 94 flammability test should also be passed at the V-0 level.

In principle, besides halogen-containing systems, four halogen-free FR systems are used in thermoplastics:

Inorganic flame retardants which must be employed in large amounts to be effective.

Nitrogen-containing FR systems, such as melamine cyanurate, which has limited efficacy in thermoplastics, eg. polyamide. In reinforced polyamide, it is effective only in combination with shortened glass fibers. In polyesters, melamine cyanurate is not effective.

Phosphorus-containing FR systems, which are generally not effective in polyesters.

Phosphorus/nitrogen-containing FR systems, eg. ammonium polyphosphates or melamine phosphates, which have insufficient thermal stability for thermoplastics processed above 200° C.

JP-A 03/281 652 discloses polyalkylene terephthalates containing melamine cyanurate and glass fibers and also a phosphorus-containing flame retardant. These molding compositions contain phosphoric acid derivatives, such as phosphoric acid esters (valence state +5), which tend to "bloom" when subjected to thermal stress.

These disadvantages are also apparent for the combination of melamine cyanurate with resorcinol bis (diphenylphosphate) disclosed in JP-A 05/070 671.

It is an object of the present invention to provide flame-retardant polyester molding compositions which achieve the UL 94 classification V-0 and pass the glowing wire test. In doing so, mold deposit should be minimized, ie. "blooming" of the flame retardants should be substantially prevented. Furthermore, the mechanical properties should be maintained as far as possible.

We have found that this object is achieved by means of the thermoplastic molding compositions defined at the outset. Preferred embodiments are given in the subclaims.

The novel molding compositions comprise, as component (A), from 30 to 96%, preferably from 40 to 93%, and in particular from 50 to 85%, of a thermoplastic polyester.

Polyesters which are used are generally based on aromatic dicarboxylic acids and an aliphatic or aromatic dihydroxy compound.

A first group of preferred polyesters consists of polyalkylene terephthalates having from 2 to 10 carbon atoms in the alcohol moiety.

Polyalkylene terephthalates of this type are known per se and are described in the literature. They contain, in their main chain, an aromatic ring which derives from the aromatic dicarboxylic acid. The aromatic ring may also be substituted, for example with halogen, such as chlorine or bromine, or with $C_1$–$C_4$-alkyl, such as methyl, ethyl, isopropyl or n-propyl, n-butyl, isobutyl or tert-butyl These polyalkylene terephthalates can be prepared by reaction of aromatic dicarboxylic acids, their esters or other ester-forming derivatives with aliphatic dihydroxy compounds, in a manner known per se.

Preferred dicarboxylic acids are, for example, 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols with from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylanol and neopentyl glycol, and mixtures of these.

Particularly preferred polyesters (A) are, for example, polyalkylene terephthalates derived from alkanediols having from 2 to 6 carbon atoms. Of these, especial preference is given to polyethylene terephthalate and polybutylene terephthalate or mixtures of these.

The viscosity number of the polyesters (A) is generally in the range from 70 to 220, preferably from 80 to 160 (measured in a 0.5% strength by weight solution in a mixture of phenol and o-dichlorobenzene (weight ratio 1:1) at 25° C.

Particular preference is given to polyesters whose content of carboxyl end groups is up to 100 mval/kg, preferably up to 50 mval/kg, and especially up to 40 mval/kg of polyester. Polyesters of this type may be prepared, for example, by the process of DE-A-44 01 055. The content of carboxyl end groups is generally determined by titration methods (eg. potentiometry).

Particularly preferred molding compositions contain, as component A), a mixture of polyethylene terephthalate (PET) and polybutylene terephthalate (PBT). he proportion of the polyethylene terephthalate in the mixture is preferably up to 50% by weight, in particular from 10 to 30% by weight, based on 100% by weight of A).

Novel molding compositions of this type have very good flame retardance and improved mechanical properties.

It is moreover advantageous to use recycled PET materials (also termed scrap PET) in a mixture with polyalkylene terephthalates, such as PBT.

For the purposes of the invention, recycled materials are generally:

1) Post-industrial recycled materials: these are production wastes from polycondensation or processing, eg. injection-molding sprues, start-up material from injection molding or extrusion or edge cuts from extruded sheets or films.

2) Post-consumer recycled materials: these are plastic items which are collected and reprocessed after use by the final consumer. The items which, in terms of quantity, predominate by a wide margin are blow-molded PET bottles for mineral water, soft drinks and juices.

Both types of recycled material may be in the form either of regrind or of pellets. In the latter case, the raw recycled materials, after separation and cleaning, are melted in an extruder and pelletized. This usually makes the material easier to handle, more free-flowing and easier to meter out for further processing steps.

The recycled materials used may be either pelletized or in the form of regrind; the maximum edge length should be 6 mm, preferably below 5 mm.

Because polyesters can be cleaved by hydrolysis during processing (by traces of moisture), it is advisable to predry the recycled material. The residual moisture content after drying is preferably from 0.01 to 0.7%, in particular from 0.2 to 0.6%.

A further group which may be mentioned is that of the fully aromatic polyesters derived from aromatic dicarboxylic acids and aromatic dihydroxy compounds.

Suitable aromatic dicarboxylic acids are the compounds described above in relation to polyalkylene terephthalates. Preference is given to mixtures of from 5 to 100 mol % of isophthalic acid and from 0 to 95 mol % of terephthalic acid, in particular mixtures of from about 80 to about 50% of terephthalic acid with about 20 to about 50% of isophthalic acid.

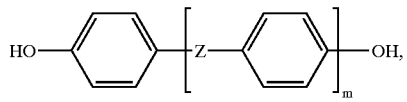

(I)

where Z is alkylene or cycloalkylene having up to 8 carbon atoms, arylene having up to 12 carbon atoms, carbonyl, sulfonyl, an oxygen or sulfur atom, or a chemical bond, and where m is from 0 to 2. Compounds I may also carry $C_1$–$C_6$-alkyl or -alkoxy and fluorine, chlorine or bromine as substituents on the phenylene groups.

Examples of parent compounds are
dihydroxydiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone,
di(hydroxybenzoyl)benzene,
resorcinol and
hydroquinone and their ring-alkylated and ring-halogenated derivatives.

Of these, preferred compounds are
4,4'-dihydroxydiphenyl,
2,4-di(4"-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane and mixtures of these.

It is also possible, of course, to employ mixtures of polyalkylene terephthalates and fully aromatic polyesters. These generally include from 20 to 98% by weight of the polyalkylene terephthalate and from 2 to 80% by weight of the fully aromatic polyester.

For the purposes of the present invention, polyesters are also intended to include polycarbonates which can be obtained by polymerization of aromatic dihydroxy compounds, in particular 2,2-bis(4-hydroxyphenyl)propane (bisphenol A) and its derivatives, for example with phosgene. Corresponding products are known per se and are described in the literature, and are mostly also commercially available. The amount of the polycarbonates is up to 90% by weight, preferably up to 50% by weight, based on 100% by weight of component (A).

Polyester block copolymers, such as copolyether esters, may, of course, also be used. Products of this type are known per se and are described in the literature, for example in US-A-3 651 014. corresponding products are also commercially available, for example Hytrel® (DuPont).

The novel thermoplastic molding compositions comprise, as component B), from 1 to 30% by weight, preferably from 1 to 20% by weight, and in particular from 5 to 20% by weight, of melamine cyanurate as flame retardant.

The melamine cyanurate used in the invention (component B) is a reaction product of preferably equimolar amounts of melamine (formula I) and cyanuric acid or isocyanuric acid (formulae IIa and IIb).

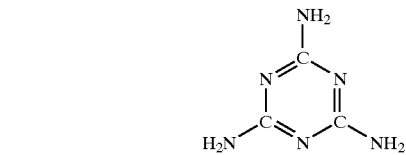

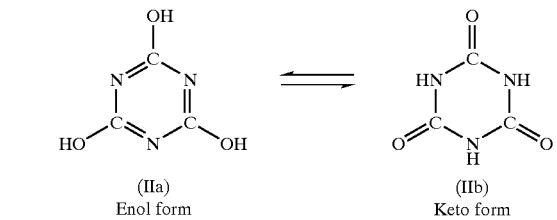

(IIa) Enol form     (IIb) Keto form

It is obtained, for example, by reaction of aqueous solutions of the starting materials at from 90 to 100° C. The commercially available product is a white powder with a mean particle size $d_{50}$ of from 1.5 to 7 μm.

Suitable flame retardants C) are present in the novel molding compositions in amounts of from 1 to 30% by weight, preferably from 1 to 25% by weight, and in particular from 10 to 20% by weight, based on the total weight of components A) to E).

Component C) is an organic or inorganic phosphorus-containing compound in which the phosphorus has a valence state from −3 to +5. The term valence state is taken to mean oxidation state, as given in "Lehrbuch der Anorganischen Chemie" by A. F. Hollemann and E. Wiberg, Walter des Gruyter and Co. (1964, 57th to 70th Edition), pp. 166–177. Phosphorus compounds of valence states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

From the large number of phosphorus-containing compounds, only a few examples are mentioned.

Examples of phosphorus compounds of the phosphine class, having the valence state −3, are aromatic phosphines, such as triphenyl phosphine, tritolyl phosphine, trinonyl phosphine, and trinaphthyl phosphine. Triphenyl phosphine is particularly suitable.

Examples of phosphorus compounds of the diphosphine class, having the valence state −2, are inter alia tetraphenyldiphosphine and tetranaphthyldiphosphine. Tetranaphthyldiphosphine is particularly suitable.

Phosphorus compounds of the valence state −1 are derived from phosphine oxide.

Suitable phosphine oxides are those of the formula I

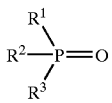

where $R^1$, $R^2$ and $R^3$ are identical or different alkyl, aryl, alkylaryl or cycloalkyl having from 8 to 40 carbon atoms.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl)phosphine oxide, benzylbisphenylphosphine oxide, phenylbis(n-hexyl)phosphine oxide. Particular preference is given to using triphenylphosphine oxide, tricyclohexylphosphine oxide and tris(n-octyl)phosphine oxide.

Compounds which are likewise suitable are triphenylphosphine sulfide and its derivatives corresponding to the phosphine oxides described above.

Phosphorus of the valence state ±0 is elemental phosphorus. Examples are red and black phosphorus, red phosphorus being preferred.

Examples of phosphorus compounds of the oxidation state +1 are hypophosphites. They may have the character of salts or be purely organic. Examples are calcium hypophosphite and magnesium hypophosphite, in addition double and complex hypophosphites, organic hypophosphites, such as cellulose hypophosphite esters, diol esters of hypophosphorous acids, for example those of 1,10-dodecyldiol. Substituted phosphinic acids and their anhydrides, for example diphenylphosphinic acid, may also be employed. Further examples are di-p-tolylphosphinic acid and di-cresylphosphinic anhydride, and also inter alia compounds such as bis(diphenylphosphinic acid) esters of hydroquinone, ethylene glycol and propylene glycol. Other suitable compounds are aryl(alkyl)phosphinic amides, such as diphenylphosphinic dimethylamide and sulfonamidoaryl (alkyl)phosphinic acid derivatives, such as p-tolylsulfonamidodiphenylphosphinic acid. Preference is given to using the bis(diphenylphosphinic acid) esters of hydroquinone and of ethylene glycol and hydroquinone bisdiphenylphosphinate.

Phosphorus compounds of the oxidation state +3 are derived from phosphorous acid. Suitable compounds are cyclic phosphonates derived from pentaerythritol, neopentyl glycol or pyrocatechol. Phosphorus of the valence state +3 is also present in triaryl(alkyl)phosphites, such as triphenyl phosphite, tris(4-decylphenyl) phosphite, tris(2,4-di-tert-butyl-phenyl) phosphite or phenyl didecyl phosphite inter alia. Further examples are, however, diphosphites, such as propylene glycol 1,2-bis(diphosphite) and cyclic phosphites derived from pentaerythritol, neopentyl glycol or pyrocatechol.

Particular preference is given to neopentyl glycol methylphosphonate and methyl neopentyl glycol phosphite, and pentaerythritol dimethyl diphosphonate and dimethyl pentaerythritol diphosphite.

Examples of phosphorus compounds of the oxidation state +4 are primarily hypodiphosphates, for example tetraphenyl hypodiphosphate and bisneopentyl hypodiphosphate.

Examples of phosphorus compounds of the oxidation state +5 are primarily alkyl- and aryl-substituted phosphates, such as phenyl bisdodecyl phosphate, phenyl ethyl hydrogen phosphate, phenyl bis(3,5,5-trimethylhexyl) phosphate, ethyl diphenyl phosphate, 2-ethylhexyl ditolyl phosphate, diphenyl hydrogen phosphate, bis(2-ethylhexyl)-p-tolyl phosphate, tritolyl phosphate, bis(2-ethylhexyl) phenyl phosphate, dinonyl phenyl phosphate, phenyl methyl hydrogen phosphate, di(dodecyl) p-tolyl phosphate, p-tolyl bis(2, 5,5-trimethylhexyl) phosphate and 2-ethylhexyl diphenyl phosphate. Phosphorus compounds in which every radical is aryloxy are particularly suitable. very particularly suitable compounds are triphenyl phosphate and resorcinol bis (diphenyl) phosphate and its ring-substituted derivatives of the formula

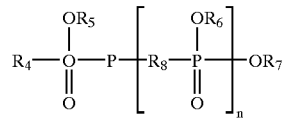

where $R_4$-$R_7$ are each an aromatic radical having from 6 to 20 carbon atoms, preferably phenyl, which may be substituted with alkyl having from 1 to 4 carbon atoms, preferably methyl, $R_8$ is a bivalent phenol, preferably

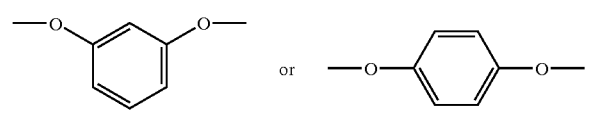

and n is from 1 to 100, preferably from 1 to 5.

Cyclic phosphates may additionally also be employed, diphenyl pentaerythritol diphosphate and phenyl neopentyl phosphate being particularly suitable.

Besides the abovementioned low-molecular-weight phosphorus compounds, oligomeric and polymeric phosphorus compounds are also suitable.

Halogen-free polymeric organic phosphorus compounds of this type, having phosphorus in the polymer chain, are formed, for example, in the preparation of pentacyclic unsaturated phosphine dihalides, as described, for example, in DE-A-20 36 173. The molecular weight of the polyphospholine oxides measured by vapor-pressure osmometry in dimethylformamide is claimed to be in the range from 500 to 7,000, preferably from 700 to 2,000.

Here phosphorus has the oxidation state−1.

Inorganic coordination polymers of aryl(alkyl)phosphinic acids, such as poly-β-sodium(I) methylphenylphosphinate, may also be employed. Their preparation is given in DE-A-31 40 520. Phosphorus has the oxidation number +1.

Halogen-free polymeric phosphorus compounds of this type can furthermore result from the reaction of a phosphonic acid chloride, such as phenyl-, methyl-, propyl-, styryl- or vinylphosphonic acid dichloride, with dihydric phenols, such as hydroquinone, resorcinol, 2,3,5-trimethylhydroquinone, bisphenol A, or tetramethylbisphenol A.

Other halogen-free polymeric phosphorus compounds which may be present in the novel molding compositions are prepared by reacting phosphoryl chloride or phosphoric ester dichlorides with a mixture of mono-, di- and trihydric phenols and other hydroxyl-containing compounds (cf. Houben-Weyl-Müller, Thieme-Verlag Stuttgart, Organische Phosphorverbindungen Part II (1963)). Furthermore, polymeric phosphonates can be prepared by transesterification of phosphonates with dihydric phenols (cf. DE-A-29 25 208) or by reaction of phosphonates with diamines, diamides or hydrazides (cf. U.S. Pat. No. 4,403,075). The inorganic compound poly(ammonium phosphate) is, however, also suitable.

Use may also be made of oligomeric pentaerythritol phosphites, phosphates and phosphonates according to EP-B 8 486, for example Mobil Antiblaze® 19 (registered trademark of Mobil Oil).

The novel molding compositions comprise, as component D), from 0.01 to 5% by weight, preferably from 0.05 to 3% by weight, and in particular from 0.1 to 2% by weight, of at least one ester or amide derived from a saturated or unsaturated aliphatic carboxylic acid having from 10 to 40 carbon atoms, preferably from 16 to 22 carbon atoms, and a saturated aliphatic alcohol or amine having from 2 to 40 carbon atoms, preferably from 2 to 6 carbon atoms.

The carboxylic acid can be mono- or dibasic, for example nonanoic acid, palmitic acid, lauric acid, 1-heptadecanoic acid, dodecanedioic acid, docosanoic acid, and particularly preferably stearic acid, decanoic acid and montanic acid (a mixture of fatty acids having from 30 to 40 carbon atoms).

The aliphatic alcohols may be mono- to tetrahydric, examples being n-butanol, n-octanol, stearyl alcohol, ethylene glycol, propylene glycol, neopentyl glycol and pentaerythritol, glycerol and pentaerythritol being preferred.

The aliphatic amines may be mono- to trihydric, examples being stearylamine, ethylenediamine, propylenediamine, hexamethylenediamine and di(6-aminohexyl)amine, ethylenediamine and hexamethylenediamine being particularly preferred. Preferred esters and amides are correspondingly glycerol distearate, glycerol tristearate, ethylenediamine distearate, glycerol monopalmitate, glycerol trilaurate, glycerol monodocosanoate and pentaerythritol tetrastearate.

Mixtures in any desired ratio of different esters or amides or esters in combination with amides may also be employed.

The novel molding compositions may contain, as component E), from 0 to 60% by weight, in particular up to 50% by weight, of conventional additives and processing aids.

Conventional additives E) are, for example, elastomeric polymers (often also referred to as impact modifiers, elastomers or rubbers) in amounts of up to 40% by weight, preferably up to 30% by weight.

These are very generally copolymers, preferably built up from at least two of the following monomers: ethylene, propylene, butadiene, isobutene, isoprene, chloroprene, vinyl acetate, styrene, acrylonitrile and (meth)acrylates having from 1 to 18 carbon atoms in the alcohol component. Polymers of this type are described, for example, in Houben-weyl, Methoden der organischen Chemie, Vol. 14/1 (Georg-Thieme-Verlag, Stuttgart, 1961), pp. 392 to 406 and in the monograph by C. B. Bucknall, "Toughened Plastics" (Applied Science Publishers, London, 1977).

Some preferred types of such elastomers are listed below. Preferred types of such elastomers are the ethylene-propylene rubbers (EPM) and the ethylene-propylene-diene rubbers (EPDM).

EPM rubbers generally have virtually no residual double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes with from 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo(5.2.1.0.2.6)-3,8-decadiene or mixtures of these. Preference is given to hexa-1,5-diene, 5-ethylidenenorbornene and dicyclopentadiene. The diene content of the EPDM rubbers is preferably from 0.5 to 50% by weight, in particular from 1 to 8% by weight, based on the total weight of the rubber.

EPM or EPDM rubbers may preferably also be grafted with reactive carboxylic acids or their derivatives, for example acrylic acid, methacrylic acid or their derivatives, such as glycidyl (meth)acrylate, or maleic anhydride.

Copolymers of ethylene with acrylic acid and/or methacrylic acid and/or the esters of these acids are a further group of preferred rubbers. The rubbers may also include dicarboxylic acids, such as maleic acid and fumaric acid, or derivatives of these acids, eg. esters and anhydrides, and/or epoxy-containing monomers. These dicarboxylic acid derivatives or epoxy-containing monomers are preferably incorporated in the rubber by addition to the monomer mixture of monomers containing dicarboxylic-acid and/or epoxy groups and having the formula I, II, III or IV

  (I)

  (II)

  (III)

  (IV)

where $R^1$ to $R^9$ are hydrogen or alkyl having from 1 to 6 carbon atoms, and m is an integer from 0 to 20, g is an integer from 0 to 10, and p is an integer from 0 to 5.

$R^1$ to $R^9$ are preferably hydrogen, where m is 0 or 1 and 9 is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing (meth) acrylates, such as glycidyl (meth)acrylate, and the esters with tertiary alcohols, such as tert-butyl acrylate. Although these latter have no free carboxyl groups, their behavior approaches that of the free acids, and they are therefore referred to as monomers with latent carboxyl groups.

The copolymers advantageously consist of from 50 to 98% by weight of ethylene, from 0.1 to 20% by weight of epoxy-containing monomers and/or monomers containing methacrylic acid and/or acid anhydride groups, the residual amount being (meth)acrylates.

Particular preference is given to copolymers of
  from 50 to 98% by weight, in particular from 55 to 95% by weight, of ethylene,
  from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred acrylates and/or methacrylates are methyl, ethyl, propyl, isobutyl and tert-butyl (meth) acrylates.

Besides these, vinyl esters and vinyl ethers may also be employed as comonomers.

The ethylene copolymers described above may be prepared by processes known per se, preferably by random copolymerization under elevated pressure and temperature. Corresponding processes are well known.

Other preferred elastomers are emulsion polymers whose preparation is described, for example, by Blackley in the monograph "Emulsion Polymerization". The emulsifiers and catalysts which may be used are known per se.

In principle, both elastomers with a homogeneous construction and those with a shell construction may be employed. The shell-type construction results from the addition sequence of the individual monomers; the morphology of the polymers is also influenced by this addition sequence.

Compounds which may be mentioned here merely as examples of monomers for preparing the elastic part of the elastomers are acrylates, for example n-butyl acrylate and 2-ethylhexyl acrylate, the corresponding methacrylates, butadiene and isoprene and mixtures of these. These monomers may be copolymerized with other monomers, such as styrene, acrylonitrile, vinyl ethers and other acrylates or methacrylates, such as methyl methacrylate, methyl acrylate, ethyl acrylate and propyl acrylate.

The soft or elastic phase (with a glass transition temperature of less than 0° C.) of the elastomers can be the core, the outer shell or an intermediate layer (in elastomers having a construction involving more than two layers); multishell elastomers may also have more than one layer formed from an elastic phase.

If one or more hard components (with glass transition temperatures of greater than 20° C.) are also involved, besides the elastic phase, in the construction of the elastomer, these are generally prepared by polymerization of styrene, acrylonitrile, methacrylonitrile, a-methylstyrene, p-methylstyrene, or acrylates or meth-acrylates, such as methyl acrylate, ethyl acrylate and methyl methacrylate, as main monomers. Besides these, smaller amounts of other comonomers may also be employed here.

In a number of cases, it has proven advantageous to employ emulsion polymers having reactive groups at the surface. Groups of this type are, for example, epoxy, carboxyl, latent carboxyl, amino and amido, and functional groups which can be introduced by additional use of monomers of the formula

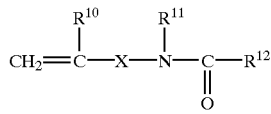

where $R^{10}$ is hydrogen or $C_1$–$C_4$-alkyl, $R^{11}$ is hydrogen, $C_1$–$C_8$-alkyl or aryl, in particular phenyl, $R^{12}$ is hydrogen, $C_1$–$C_{10}$-alkyl, $C_6$–$C_{12}$-aryl or —$OR^{13}$ $R^{13}$ is $C_1$–$C_8$-alkyl or $C_6$–$C_{12}$-aryl, each of which may be substituted with oxygen- or nitrogen-containing groups, X is a chemical bond, $C_1$–$C_{10}$-alkylene or $C_6$–$C_{12}$-arylene or

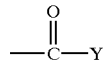

Y is O—Z or NH—Z and

Z is $C_1$–$C_{10}$-alkylene or $C_6$–$C_{12}$-arylene.

The graft monomers described in EP-A 208 187 are also suitable for introducing reactive groups at the surface.

Further examples are acrylamide, methacrylamide, and substituted acrylates and methacrylates, such as (N-tert-butylamino)ethyl methacrylate, (N,N-dimethylamino)ethyl acrylate, (N, N-dimethylamino)methyl acrylate and (N,N-diethylamino) ethyl acrylate.

The constituents of the elastic phase may also be crosslinked. Monomers which act as crosslinkers are, for example, buta-1,3-diene, divinylbenzene, diallyl phthalate, dihydrodicyclopentadienyl acrylate and the compounds described in EP-A 50 265.

Use may, furthermore, also be made of graft-linking monomers, ie. monomers having two or more polymerizable double bonds which react at different rates during polymerization. Preference is given to these compounds in which at least one reactive group polymerizes at about the same rate as the remaining monomers, whereas the other reactive group(s), for example, polymerize(s) significantly more slowly. The different polymerization rates give rise to a certain proportion of unsaturated double bonds in the elastomer. If a further phase is then grafted onto an elastomer of this type, at least some of the double bonds in the elastomer react with the graft monomers to form chemical bonds, ie. the grafted phase is, at least to some extent, linked to the graft base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate, and the corresponding monoallyl compounds of these dicarboxylic acids. In addition, there are a wide variety of other suitable graft-linking monomers; further details may be seen, for example, in U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below, beginning with graft polymers which have a core and at least one outer shell, and which have the following construction;

| Type | Monomers for the core | Monomers for the shell |
|---|---|---|
| I | Buta-1,3-diene, isoprene, n-butyl acrylate, ethyl-hexyl acrylate or mixtures of these | Styrene, acrylonitrile, methyl methacrylate |
| II | AS I but with additional use of crosslinkers | As I |
| III | As I or II | n-Butyl acrylate, ethyl acrylate, methyl acrylate, buta-1,3-diene, isoprene ethylhexyl acrylate |

-continued

| Type | Monomers for the core | Monomers for the shell |
|------|----------------------|------------------------|
| IV | As I or II | As I or III but with additional use of monomers with reactive groups as described herein |
| V | Styrene, acrylonitrile, methyl methacrylate or mixtures of these | First shell of monomers as described under I and II for the core Second shell as described under I or IV for the shell |

The graft polymers, in particular ABS and/or ASA polymers in amounts of up to 40% by weight, are preferably employed for impact modification of PBT, if desired as a mixture with up to 40% by weight of polyethylene terephthalate. Blends of this type are obtainable under the trademark Ultradur®S (previously ultrablend®s of BASF AG). ABS/ASA mixtures with polycarbonates are commercially obtainable under the trademark Terblend® (BASF AG).

Instead of graft polymers with a multishell construction, homogeneous, ie. single-shell, elastomers of buta-1,3-diene, isoprene and n-butyl acrylate or copolymers of these may also be employed. These products may also be prepared with additional use of crosslinking monomers or monomers with reactive groups.

Examples of preferred emulsion polymers are n-butyl acrylate-(meth)acrylate copolymers, n-butyl acrylate-glycidyl acrylate and n-butyl acrylate-glycidyl methacrylate copolymers, graft polymers with an inner core of n-butyl acrylate or based on butadiene and an outer shell of the abovementioned copolymers and copolymers of ethylene with comonomers which provide reactive groups.

The elastomers described may also be prepared by other conventional processes, for example by suspension polymerization.

Preference is likewise given to silicone rubbers, as described in DE-A-37 25 576, EP-A 235 690, DE-A-38 00 603 and EP-A 319 290. Mixtures of the rubber types mentioned above may, of course, also be employed.

Examples of fibrous or particulate fillers are carbon fibers, glass fibers, glass beads, amorphous silica, asbestos, calcium silicate, calcium metasilicate, magnesium carbonate, kaolin, chalk, quartz powder, mica, barium sulfate and feldspar, employed in amounts of up to 50% by weight, in particular up to 40% by weight.

Examples of preferred fibrous fillers are carbon fibers, aramide fibers and potassium titanate fibers, glass fibers made from E glass being particularly preferred. These may be employed as rovings or as chopped glass in the forms which are commercially available.

The fibrous fillers may be pretreated on their surfaces with a silane compound, for better compatibility with the thermoplastics.

Suitable silane compounds are those of the formula III $$(X-(CH_2)_n)_k-Si-(O-C_mH_{2m+1})_{2-k} \quad \text{III}$$

where:

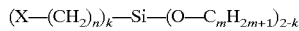

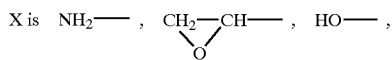

n is an integer from 2 to 10, preferably 3 or 4,
m is an integer from 1 to 5, preferably 1 or 2,
k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which contain glycidyl as substituent x.

The silane compounds are usually employed for surface coating in amounts of from 0.05 to 5% by weight, preferably from 0.5 to 1.5% by weight and in particular from 0.8 to 1% by weight (based on D).

Acicular mineral fillers are also suitable.

For the purposes of the invention, acicular mineral fillers are mineral fillers of strongly developed acicular character, for example acicular wollastonite. The mineral preferably has an L/D (length to diameter) ratio of from 8:1 to 35:1, preferably from 8:1 to 11:1. The mineral filler may, if desired, be pretreated with the abovementioned silane compounds, but the pretreatment is not essential.

Examples of other fillers are kaolin, calcined kaolin, wollastonite, talc and chalk.

The novel thermoplastic molding compositions may contain, as component E), conventional processing aids, such as stabilizers, oxidation inhibitors, thermal and UV stabilizers, lubricants, demolding aids, colorants, such as dyes and pigments, nucleating agents, plasticizers, etc.

Examples of oxidation inhibitors and thermal stabilizers are sterically hindered phenols and/or phosphites, hydroquinones, aromatic secondary amines such as diphenylamines, and various substituted representatives of these groups, and mixtures of these in concentrations of up to 1% by weight, based on the weight of the thermoplastic molding compositions.

Examples of UV stabilizers, generally used in amounts of up to 2% by weight, based on the molding composition, are various substituted resorcinols, salicylates, benzotriazoles and benzophenones.

Inorganic pigments, such as titanium dioxide, Ultramarine blue, iron oxide and carbon black, and organic pigments, such as phthalocyanines, quinacridones and perylenes, and dyes, such as nigrosin and anthraquinones, may be added as colorants.

Sodium phenylphosphinate, alumina or silica and preferably talc may be added as nucleating agent.

Lubricants and demolding aids, which are usually employed in amounts of up to 1% by weight, are preferably long-chain fatty acids (eg. stearic acid and docosanoic acid), salts of these (eg. calcium and zinc stearates) or amide derivatives (eg. ethylenebisstearylamide) or montan waxes (mixtures of straight-chain, saturated carboxylic acids with chain lengths of from 28 to 32 carbon atoms) or low-molecular-weight polyethylene waxes or polypropylene waxes.

Examples of plasticizers are dioctyl phthalate, dibenzyl phthalate, butyl benzyl phthalate, hydrocarbon oils and N-(n-butyl)benzenesulfonamide.

The novel molding compositions may also include from 0 to 2% by weight of fluorine-containing ethylenic polymers. These are ethylenic polymers with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with smaller proportions (generally up to 50% by weight) of copolymerizable ethylenically unsaturated monomers. These are described, for example, by Schildknecht in "Vinyl and Related Polymers", Wiley-Verlag, 1952, p. 484 to 494 and by Wall in "Fluoropolymers" (Wiley Interscience, 1972).

These fluorine-containing ethylenic polymers are homogeneously distributed in the molding compositions and preferably have a particle size $d_{50}$ (number average) in the range from 0.05 to 10 μm. in particular from 0.1 to 5 μm. These low particle sizes may particularly preferably be achieved by the use of aqueous dispersions of fluorine-containing ethylenic polymers and by incorporating these in a polyester melt.

The novel thermoplastic molding compositions can be prepared by processes known per se, by mixing the starting components in conventional mixing apparatus such as screw-extruders, Brabender mixers or Banbury mixers, and then extruding them. After extrusion, the extrudate can be cooled and comminuted. It is also possible to premix individual components and then to add the remaining starting materials, either individually or mixed. The mixing is generally carried out at from 230 to 290° C.

In a preferred method of operation, components B) to D) and, if desired, conventional additives E) can be mixed with a polyester prepolymer, compounded and granulated. The resultant granules are then subjected in solid phase to continuous or batch condensation under inert gas at a temperature below the melting point of component A), until the desired viscosity is reached.

The novel thermoplastic molding compositions have good mechanical properties and good flame retardancy and at the same time pass the glowing-wire test. Processing can be carried out without any significant modification of the polymer matrix, and mold deposit is sharply reduced. The molding compositions are suitable for producing fibers, films and shaped articles, in particular for applications in the electrical and electronics sectors. Particular applications are lamp parts, such as lamp sockets and lamp holders, plugs and multipoint connectors, coil formers, casings for capacitors or connectors, and circuit-breakers, relay housings and reflectors.

EXAMPLES 1 to 10 and Comparative Examples 1* to 6*

Component A): Polybutylene terephthalate with a viscosity number of 130 ml/g and a content of carboxyl end groups of 34 mval/kg (Ultradur® B 4500 from BASF AG) (viscosity number measured in 0.5% strength by weight solution of phenol/o-dichlorobenzene, 1:1 mixture, at 25° C.).

Component B: Melamine cyanurate

Component C:

C1 triphenylphosphine oxide

C2 triphenyl phosphate

C3 resorcinol bis(diphenyl phosphate)

Component D: Pentaerythritol tetrastearate

Component E: Chopped glass fiber with a thickness of 10 μm (epoxysilanized size).

The components A) to E) were blended in a twin-screw extruder at from 250 to 260° C., and extruded into a waterbath. After granulation and drying, test specimens were injection molded and tested.

The flammability test was carried out according to UL 94 on 1/16 inch test specimens with the usual conditioning. The migration tendency was tested visually on the specimen after storage by comparing with a specimen which had not been stored.

Stability at high service temperatures was tested as follows: injection moldings were produced (small sheets measuring 60×60×2 mm, about 11 g), and in each case a molding was weighed on the analytical balance and heated to the stated temperature in an aluminum dish in the drying cabinet under reduced pressure.

After the respective storage time (7 or 3 days), the specimens, cooled under reduced pressure, were reweighed on the analytical balance and the weight loss determined.

The formulations of the molding compositions and the results of the measurements are seen in Tables 1 and 2.

TABLE 1

| Example | Formulation in % by weight | UL 94 1/16" | Migration on storage 7 days, 120° C. |
|---|---|---|---|
| 1 | 39.5A, 15B, 20C1, 0.5D 25E | V-0 | no |
| 1* | 40A, 15B, 20C1, 25E | V-0 | yes |
| 2 | 39.5A, 15B, 20C2, 0.5D 25E | V-0 | no |
| 2* | 40A, 15B, 20C2, 25E | V-0 | yes |
| 3 | 39.5A, 15B, 20C3, 0.5D 25E | V-0 | no |
| 3* | 40A, 15B, 20C3, 25E | V-0 | yes |

*for comparison

TABLE 2

| Ex. | 4* | 5 | 6 | 5* | 7 | 8 | 6* | 9 | 10 |
|---|---|---|---|---|---|---|---|---|---|
| A | 45.00 | 44.77 | 44.77 | 45.00 | 44.77 | 44.77 | 45.00 | 44.77 | 44.77 |
| B | 10.00 | 10.00 | 10.00 | 10.00 | 10.00 | 10.00 | 10.00 | 10.00 | 10.00 |
| D | — | 0.23 | 0.53 | — | 0.23 | 0.53 | — | 0.23 | 0.53 |
| C1 | 15.00 | 15.00 | 15.00 | | | | | | |
| C2 | | | | 15.00 | 15.00 | 15.00 | | | |
| C3 | | | | | | | 15.00 | 15.00 | 15.00 |
| E | 30.00 | 30.00 | 30.00 | 30.00 | 30.00 | 30.00 | 30.00 | 30.00 | 30.00 |
| Weight loss (%) after storage | | | | | | | | | |
| 3d/ 120° C. | 0.94 | 0.81 | 0.77 | 0.24 | 0.19 | 0.20 | 0.12 | 0.12 | 0.11 |
| 3d/ 150° C. | 6.73 | 5.71 | 5.23 | 4.06 | 2.21 | 0.35 | 0.33 | 0.28 | 0.17 |

EXAMPLES 11 to 23

Component A1: polybutylene terephthalate having a viscosity number (VN) of 130 ml/g and a carboxyl end group content of 34 mval/kg (Ultradur® B 4500 of BASF AG) (VN measured in 0.5% strength by weight solution of a 1:1 mixture of phenol and o-dichlorobenzene at 25° C.).

Component A2a; polyethylene terephthalate (PET) having a VN of 76 ml/g.

Component A2b: PET post-industrial recycled material in the form of cylindrical pellets. The viscosity number (ISO 1628-5, phenol/1,2-dichlorobenzene 1/1) was 81 ml/g and the residual moisture after predrying was 0.02%.

Component A2c: polycarbonate having a VN of 64 ml/g, measured in phenol/dichlorobenzene (1:1) (Lexan® 161 of General Electric Plastics).

Component B; Melamine cyanurate

Component C/1: resorcinol bis(diphenyl phosphate)

Component C/2: calcium hypophosphite

Component D: pentaerythritol tetrastearate

Component E: Chopped glass fiber having a thickness of 10 μm (epoxysilanized size).

Components A) to E) were blended in a twin-screw extruder at from 250 to 260° C. and extruded into a water bath. After the extrudate had been pelletized and dried, test specimens were injection molded and tested.

For the fire test, bars were injection molded and, after the usual conditioning, tested to UL 94. The glowing-wire test was carried out on small sheets measuring 60/60 mm of 1 and 3 mm thickness. The wire temperature for the test was 960° C.

The modulus of elasticity and also the breaking stress were determined according to DIN 527. The impact strength was measured according to ISO 179/1 eU.

The results of the measurements and the formulations of the molding compositions are given in Table 3.

TABLE 3

| Example | 11 | 12 | 13 | 14 | 15 |
|---|---|---|---|---|---|
| A1 | 49.7 | 39.7 | 39.7 | 39.7 | 29.7 |
| A2a | — | 10 | — | — | 20 |
| A2b | — | — | 10 | — | — |
| A2c | — | — | — | 10 | — |
| B | 10 | 10 | 10 | 10 | 10 |
| C/1 | 10 | 10 | 10 | 10 | 10 |
| D | 0.3 | 0.3 | 0.3 | 0.3 | 0.3 |
| E | 30 | 30 | 30 | 30 | 30 |
| Modulus of elasticity | 6800 | 7800 | 7700 | 7800 | 8900 |
| Breaking stress | 84 | 91 | 90 | 103 | 109 |
| Impact strength | 44 | 45 | 46 | 48 | 49 |
| UL 94, 1.6 mm | n.c. | V-2 | V-2 | V-2 | V-2 |
| 960° C. 1/3 mm | −/+ | +/+ | +/+ | +/+ | +/+ |

| Example | 16 | 17 | 18 | 19 | 20 | 21 |
|---|---|---|---|---|---|---|
| A1 | 44.7 | 34.7 | 34.7 | 34.7 | 34.7 | 24.7 |
| A2a | — | 10 | — | — | — | 10 |
| A2b | — | — | 10 | — | — | — |
| A2c | — | — | — | 10 | — | — |
| B | 10 | 10 | 10 | 10 | 10 | 10 |
| C/1 | 15 | 15 | 15 | 15 | 20 | 20 |
| D | 0.3 | 0.3 | 0.3 | 0.3 | 0.3 | 0.3 |
| E | 30 | 30 | 30 | 30 | 30 | 30 |
| Modulus of elasticity [MPa] | 6600 | 7700 | 7800 | 7900 | 6300 | 7200 |
| Breaking stress [kJ/m²] | 84 | 91 | 90 | 97 | 72 | 72 |
| Impact strength | 44 | 45 | 46 | 57 | 35 | 33 |
| UL 94, 1.6 mm | n.c. | V-2 | V-2 | V-2 | V-2 | V-0 |
| 960° C. 1/3 mm | +/+ | +/+ | +/+ | +/+ | +/+ | +/+ | n.c.: not classified

| Example | 22 | 23 |
|---|---|---|
| A1 | 49.7 | 29.7 |
| A2a | — | 20 |
| B | 10 | 10 |
| C/2 | 10 | 10 |
| D | 0.3 | 0.3 |
| E | 30 | 30 |
| Modulus of elasticity [MPa] | 12200 | 12600 |
| Breaking stress [kJ/m²] | 113 | 118 |
| UL 94, 1.6 mm | V-1 | V-1 |
| 960° C. 1/3 mm | +/+ | +/+ |

We claim:

1. A thermoplastic molding composition comprising
   A) from 30 to 96% by weight of a polyester
   B) from 1 to 30% by weight of melamine cyanurate
   C) from 1 to 30% by weight of at least one phosphorus-containing flame retardant,
   D) from 0.01 to 5% by weight of pentaerythritol tetrastearate.
   E) from 0 to 60% by weight of other additives and processing aids,
   where the total of the percentages by weight of components A) to E) is 100%.

2. A thermoplastic molding composition as claimed in claim 1, comprising, as flame retardant C), at least one phosphine oxide of the formula I

where $R^1$, $R^2$ and $R^3$ are identical or different alkyl, aryl, alkylaryl or cycloalkyl having from 8 to 40 carbon atoms.

3. A thermoplastic molding composition as claimed in claim 1 or 2, in which component C) consists of triphenylphosphine oxide, triphenylphosphine sulfide, triphenyl phosphate, resorcinol bis(diphenyl phosphate) or triphenylphosphine or mixtures of these.

4. A thermoplastic molding composition as claimed in any of claims 1 to 3, comprising from 1 to 40% by weight of a fibrous filler as component E).

5. A thermoplastic molding composition as claimed in any of claims 1 to 4, in which component A) consists of a mixture of polyethylene terephthalate and polybutylene terephthalate.

6. A thermoplastic molding composition as claimed in claim 5, in which the proportion of polyethylene terephthalate in the mixture is from 10 to 30% by weight.

7. A thermoplastic molding composition as claimed in claim 5 or 6, in which the polyethylene terephthalate consists of a recycled material having a residual moisture content of from 0.01 to 0.7%.

8. A shaped article produced from a thermoplastic molding composition as claimed in claim 1.

9. A thermoplastic molding composition as claimed in claim 1, wherein said at least one phosphorus containing flame retardant of component C) is halogen free.

10. Fibers of films produced from a thermoplastic molding composition as claimed in claim 1.

11. A thermoplastic molding composition as claimed in claim 1, in which component C) is a compound of phosphorus of the oxidation state +1.

12. A thermoplastic molding composition as claimed in claim 11, wherein said phosphorus compound is a hypophosphite.

13. A thermoplastic molding composition as claimed in claim 12, wherein said hypophosphite is calcium hypophosphite, magnesium hypophosphite or a mixture of calcium hypophosphite and magnesium hypophosphite.

14. A thermoplastic molding composition as claimed in claim 1, wherein E) is selected from the group consisting of oxidation inhibitors, thermal and UV stabilizers, lubricants, demolding aids, colorants, nucleating agents and plasticizers.

15. A thermoplastic molding composition as claimed in claim 1, wherein E) is selected from the group consisting of sterically hindered phenols, sterically hindered phosphites, hydroquinones, aromatic secondary amines, substituted resorcinols, salicylates, benzotriazoles and benzophenones, titanium dioxide, Ultramarine blue, iron oxide, carbon black, phthalocyanines, quinacridones, perylenes, nigrosin, anthraquinones, sodium phenylphosphinate, alumina, silica, talc, stearic acid, docosanoic acid, calcium and zinc stearates, ethylenebisstearylamide, montan waxes and low molecular weight polyethylene waxes or polypropylene waxes.

* * * * *

UNITED STATES PATENT AND TRADEMARK OFFICE
CERTIFICATE OF CORRECTION

PATENT NO.   : 6,538,054 B1                                                                 Page 1 of 1
DATED            : March 25, 2003
INVENTOR(S)  : Klatt et al.

It is certified that error appears in the above-identified patent and that said Letters Patent is hereby corrected as shown below:

<u>Title page,</u>
Item [57], ABSTRACT,
Line 9, "&mine" should be -- amine --

<u>Column 16,</u>
Line 13, delete "or 2";
Lines 17 and 18, "any of claims 1 to 3" should be -- claim 1 --;
Lines 20-21, "any of claims 1 to 4" should be -- claim1 --; and
Line 28, delete "or 6".

Signed and Sealed this

Nineteenth Day of August, 2003

JAMES E. ROGAN
*Director of the United States Patent and Trademark Office*